United States Patent
Bakker et al.

(10) Patent No.: US 8,005,085 B2
(45) Date of Patent: Aug. 23, 2011

(54) METHOD FOR DISTRIBUTION OF DATA PACKETS IN A SINGLE FREQUENCY MOBILE COMMUNICATION NETWORK, AN ACCESS NETWORK NODE, A BASE STATION AND A SINGLE FREQUENCY MOBILE COMMUNICATION NETWORK THEREFOR

(75) Inventors: Hajo Bakker, Eberdingen (DE); Dietrich Zeller, Sindelfingen (DE)

(73) Assignee: Alcatel Lucent, Paris (FR)

( * ) Notice: Subject to any disclaimer, the term of this patent is extended or adjusted under 35 U.S.C. 154(b) by 930 days.

(21) Appl. No.: 11/924,532

(22) Filed: Oct. 25, 2007

(65) Prior Publication Data

US 2008/0101334 A1 May 1, 2008

(30) Foreign Application Priority Data

Oct. 31, 2006 (EP) ..................... 06022701

(51) Int. Cl.
*H04L 12/18* (2006.01)
*H04J 3/24* (2006.01)
*H04J 3/26* (2006.01)
(52) U.S. Cl. ............... 370/390; 370/432; 370/473
(58) Field of Classification Search ........ 370/229–238, 370/310–350, 498–524; 455/179.1, 230–231, 455/434, 449–453, 464, 515
See application file for complete search history.

(56) References Cited

U.S. PATENT DOCUMENTS

| | | | | |
|---|---|---|---|---|
| 6,138,019 A * | 10/2000 | Trompower et al. | ........... | 455/436 |
| 7,072,317 B2 * | 7/2006 | Vakil et al. | ........... | 370/332 |
| 7,574,224 B2 * | 8/2009 | Lane et al. | ........... | 455/502 |
| 7,626,975 B2 * | 12/2009 | Colban et al. | ........... | 370/350 |
| 7,664,467 B2 * | 2/2010 | Cheng et al. | ........... | 455/70 |
| 2002/0167921 A1 | 11/2002 | Vakil et al. | | |
| 2005/0094618 A1 | 5/2005 | Colban et al. | | |
| 2006/0146745 A1 | 7/2006 | Cai et al. | | |
| 2007/0177608 A1 * | 8/2007 | Ding | ........... | 370/395.6 |
| 2008/0192748 A1 * | 8/2008 | Kim et al. | ........... | 370/394 |
| 2010/0265866 A1 * | 10/2010 | Chao et al. | ........... | 370/312 |
| 2010/0322246 A1 * | 12/2010 | Rinne et al. | ........... | 370/392 |

FOREIGN PATENT DOCUMENTS

WO    WO 96/07252 A1    11/2002

OTHER PUBLICATIONS

3GPP TSG-RAN WG 3: "Architecture for Content Synchronisation" Meeting #53bis Alcatel 7.3.2 Content Synchronisation Seoul, Korea, Oct. 10-13, 2006.

* cited by examiner

Primary Examiner — Tri H Phan
(74) Attorney, Agent, or Firm — Fay Sharpe LLP

(57) ABSTRACT

The invention concerns a method for distribution of data packets (MBMS Data) from an access network node (aGW) via at least one base station (eNB) to at least one user terminal (UE) in a single frequency mobile communication network whereby information (T1(tx), T2(tx)) is added in the access network node (aGW) to the data packets (MBMS Data) indicating in which time intervals the data packets (MBMS Data) have to be sent from the at least one base station (eNB) to the at least one user terminal (UE), and information (SN) is added in the access network node (aGW) to the data packets (MBMS Data) indicating the order of the distribution of the data packets (MBMS Data), an access network node (aGW), a base station (eNB) and a single frequency mobile communication network therefor.

20 Claims, 3 Drawing Sheets

METHOD FOR DISTRIBUTION OF DATA PACKETS IN A SINGLE FREQUENCY MOBILE COMMUNICATION NETWORK, AN ACCESS NETWORK NODE, A BASE STATION AND A SINGLE FREQUENCY MOBILE COMMUNICATION NETWORK THEREFOR

BACKGROUND OF THE INVENTION

The invention is based on a priority application EP 06022701.4 which is hereby incorporated by reference.

The invention relates to a method for distribution of data packets in a single frequency mobile communication network, an access network node base station, and a single frequency mobile communication network.

A so-called single frequency network (SFN) is a broadcast or multicast network, in which several transmitters like e.g. base stations simultaneously send the same signal over the same frequency channel. Thus, for SFN operation, it has to be ensured that all base stations that are involved in SFN transmission transmit at the same time exactly the same data, like e.g. MBMS service data (MBMS=multimedia broadcast multicast service), in exactly the same protocol data unit (PDU) using exactly the same physical radio resource blocks (PRBs).

In UMTS (UMTS=Universal Mobile Telecommunication System), a solution for the transmission of MBMS service data is based on a two node approach in the radio access network (RAN), i.e. a radio network controller (RNC) is responsible for generating transport blocks and for the distribution of the transport blocks to so-called NodeBs via a so-called Iub interface. The time synchronization is realized between the RNC and all NodeBs by transmitting the MBMS service data based on the so-called Connection Frame Number (CFN).

For the Long Term Evolution (LTE) of the 3GPP radio technology (3GPP=Third Generation Partnership Project) as the potential follower of UMTS, a two node architecture consisting of an access network node, as e.g. an access gateway, and a so-called enhanced NodeB as base station has been decided by the Third Generation Partnership Project. The access network node is belonging to the core network, while the enhanced NodeB is located in the radio access network.

For the distribution of MBMS services like e.g. mobile TV, the data have to be distributed from the access network node to several enhanced NodeBs. MBMS services will operate in a Single Frequency Network mode, therefore it has to be ensured that enhanced NodeBs that are involved in SFN transmission for a certain service, transmit within the synchronized radio frames exactly the same data on exactly the same physical layer resources, like e.g. frequencies.

In addition, the access network node as core network element should be radio agnostic, i.e. radio frames and physical layer resources should not be defined by the access network node.

As an LTE system will work for unicast services without a radio network controller, the same concept should be applied for multicast or broadcast services, like the SFN transmission of MBMS service data, as well.

As the access network node should be radio agnostic, the synchronisation procedure should not use radio related parameters.

Further details of the basic principles of content synchronization in LTE systems can be found in the document 3GPP TSGRAN WG 3 Meeting #53bis, Seoul, Korea, 10-13 October 2006, tdoc R3-061534, Architecture for Content Synchronization.

SUMMARY OF THE INVENTION

The object of the invention is thus to propose a method for the distribution of data packets from an access network node via at least one base station to at least one user terminal in a single frequency mobile communication network which overcomes the above mentioned problems and fulfills the above mentioned constraints.

This object is achieved by a method, an access network node, a base station, and a single frequency mobile communication network according to the teaching of claim 8.

The main idea of the invention is to have a protocol solution to synchronise data packets used to generate certain radio frames in base stations.

Time stamps are added in an access network node to the data packets indicating in which time intervals the data packets have to be sent from the base station. Furthermore, sequence numbers are added in an access network node to the data packets indicating the order for sending the data packets from the base station.

Further developments of the invention can be gathered from the dependent claims and the following description.

BRIEF DESCRIPTION OF THE DRAWINGS

In the following, the invention will be explained further making reference to the attached drawings.

A single frequency mobile communication network in which the invention can be implemented comprises at least one access network node, at least one base station and user terminals.

Figure 1:
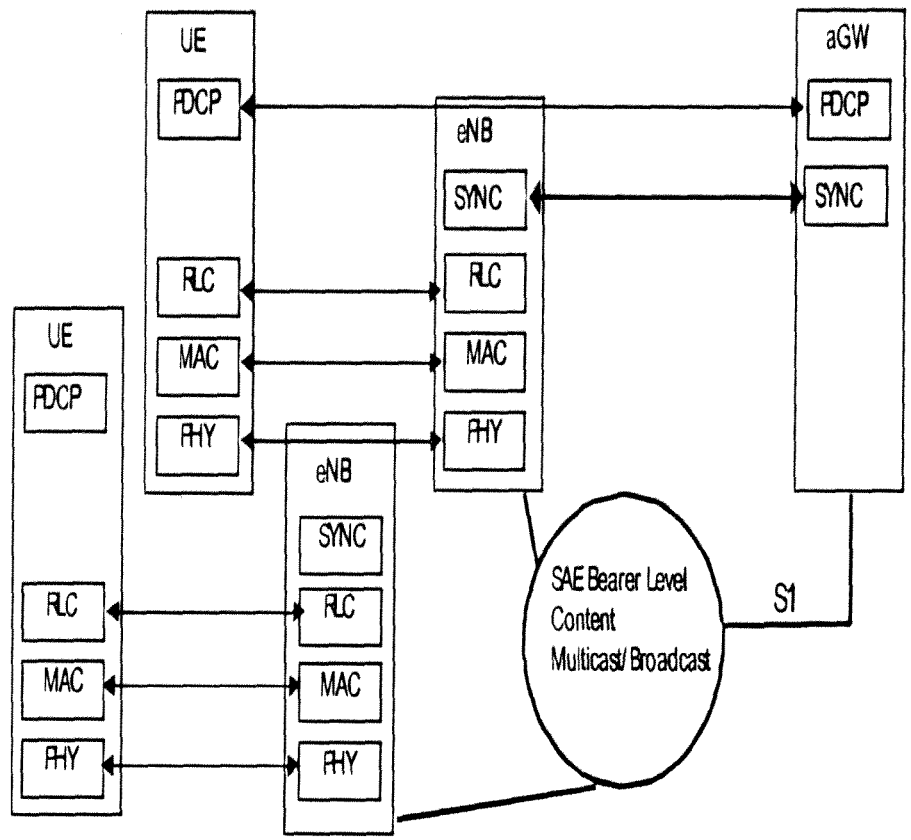
FIG. 1 schematically shows a mobile communication network in which the invention can be implemented.

FIG. 1 shows an example for such a single frequency mobile communication network that comprises one access network node aGW, base stations eNB and user terminals UE.

Furthermore, it is depicted in FIG. 1 that the access network node aGW comprises the functionalities of a so-called packet data convergence protocol layer PDCP and of a layer of a protocol to synchronize data SYNC, that base stations eNB comprise the functionalities of the layer of a protocol to synchronize data SYNC, of a radio link control layer RLC, of a media access control layer MAC, and of a physical layer PHY, and that the user terminals UE comprise the functionalities of the packet data convergence protocol layer PDCP, of the radio link control layer RLC, of the media access control layer MAC, and of the physical layer PHY.

Each of said user terminals UE is connected to one or multiple of said base stations eNB, and the base stations eNB are connected to the access network node aGW. The access network node aGW is in turn connected to a core network, which is not shown in FIG. 1 for the sake of simplicity.

The user terminals UE comprise the functionality of a user terminal for transmission and reception of signaling and data messages in a network using radio transmission.

The base stations eNB comprise the functionality of a base station of a network using radio transmission, i.e. they provide the possibility for user terminals to get connected to said network and for data exchange of said user terminals by means of radio transmission.

Furthermore, a base station eNB according to the invention is adapted to perform sending of data packets to at least one user terminal in a respective time interval that is indicated in information added to the data packets, and adapted to perform sending of said data packets to said at least one user terminal in an order that is indicated in information added to the data packets.

The access network node aGW comprises the functionality to provide a connection between the base stations eNB and the core network.

Furthermore, the access network node aGW according to the invention is adapted to perform adding of information to data packets indicating in which time intervals the data packets have to be sent from a base station to a user terminal, and adapted to perform adding of information to the data packets indicating the order of the distribution of the data packets.

The example depicted in FIG. 1 shows an LTE network for SFN transmission. Connections between protocol layers of different network devices are exemplarily depicted by double arrows.

There are connections between the so-called packet data convergence protocol layers PDCP of the access network node aGW and the user terminals UE.

There are connections between the layers of a protocol to synchronize data SYNC of the access network node aGW and the base stations eNB. Said layer of a protocol to synchronize data SYNC has been inserted below the data convergence protocol layer PDCP and above the radio link control layer RLC in order to add information e.g. to MBMS data allowing for a synchronization of the sending of the MBMS data in the base stations eNB.

There are connections between the radio link control layers RLC, between the media access control layers MAC, and between the physical layers PHY of a base station eNB and a user terminal UE.

Data packets for content multicast or broadcast are distributed over the so-called S1 interface on the so-called system architecture evolution (SAE) bearer level from the access network node to the base stations eNB, i.e. in the example depicted in FIG. 1, e.g. header compressed MBMS packet data comprising said information allowing for a synchronization of the sending of the MBMS data in the base stations eNB are distributed on an RLC SDU level (SDU=service data unit).

The following assumptions are made for a mobile communication network in which the invention will be implemented:

The base stations eNB are pre-configured via e.g. operation and maintenance (O&M), a master base station, or a central eMBMS radio resource management server (eMBMS=enhanced MBMS) to use pre-defined radio resources, as e.g. frequencies, frequency-blocks, modulation, coding, time difference between radio frames, for the MBMS service.

The data rate on the air interface based on pre-defined radio resources is known to be greater or equal to the maximum service data rate m requested for the MBMS service arriving at the access network node aGW.

Based on the different data rates on the air interface and of the service, padding information can be included by a base station eNB in the data packets transmitted to the user terminals UE.

The access network node aGW and the base station eNB are time synchronized for SFN transmission by means of GPS (GPS=Global Positioning System) or any other network synchronisation scheme like e.g. the standard IEEE 1588 for synchronizing clocks.

A maximum transmission time between the access network node aGW and a base station eNB denoted maxDelay (aGW to eNB) is known in advance depending on network configuration or dynamically determined by measurements.

The MBMS data is based on IP packets (IP=internet protocol) with different length.

The predefined radio frames can consist of different length.

The access network node aGW has knowledge of an upper bound S for the inter-scheduling interval applied by a base station eNB, i.e. for the time between two scheduling events in a base station eNB. Said upper bound S can e.g. be derived by the following consideration: The access network node aGW will explicitly or implicitly indicate a maximum transfer delay between the access network node aGW and a user terminal UE denoted Trdel to the base stations eNB. This implies that a scheduler in a base station eNB will not longer wait than S<=Trdel to schedule a packet. Otherwise the maximum transfer delay requirement can not be met. Therefore one estimate for S could be S=Trdel.

Figure 2:
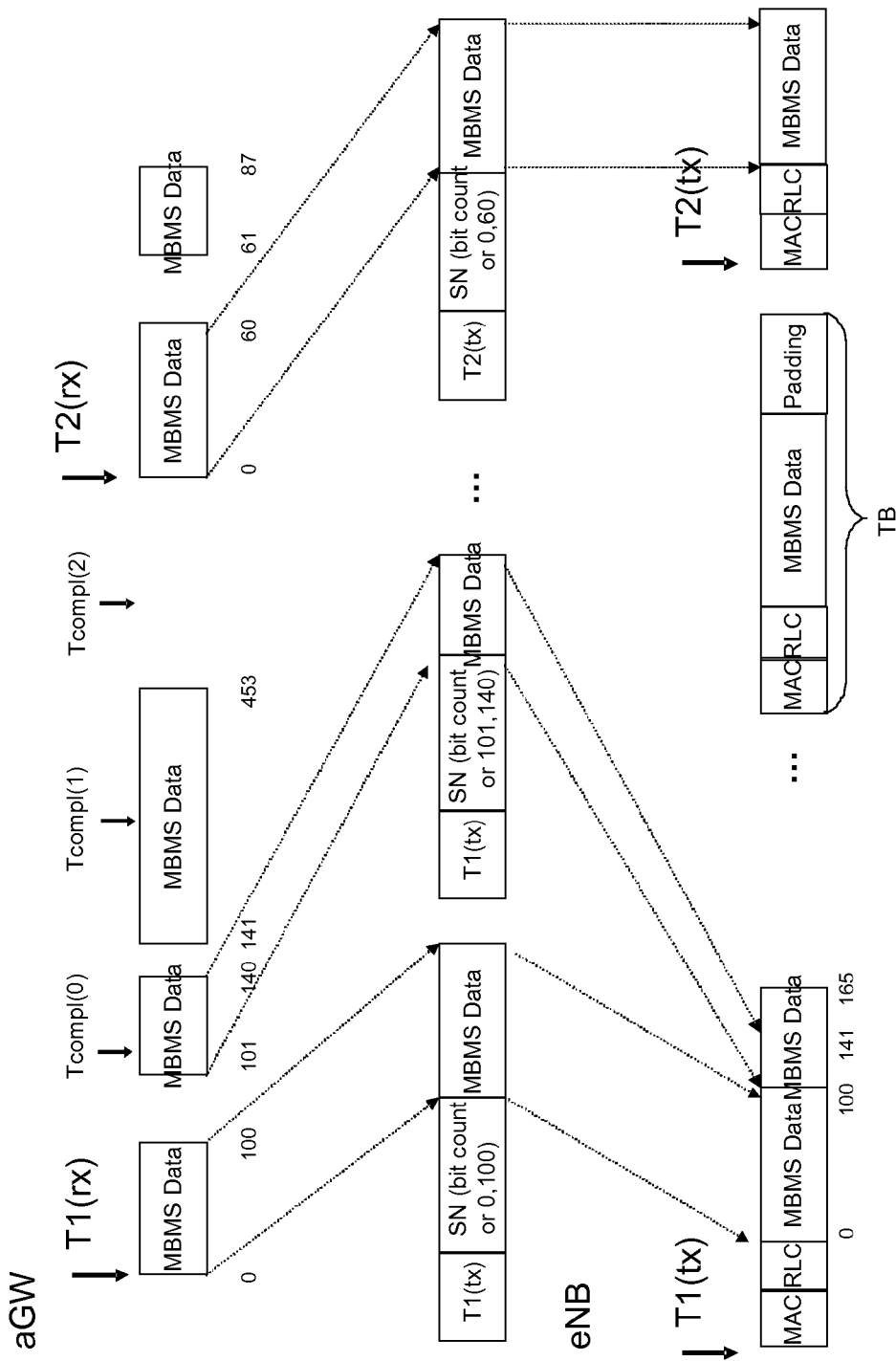
FIG. 2 schematically shows exemplarily the synchronization procedure, i.e. the handling of data packets in an access network node and in a base station, in case of data concatenation.

FIG. 2 exemplarily shows the synchronization procedure in case of concatenated MBMS data. According to the invention, for an IP packet, received at the access network node aGW from the core network and carrying MBMS information, a header compression is carried out in the PDCP layer in the access network node aGW. The compressed IP packet is called in the following MBMS data packet.

In the first row, the order of MBMS data packets denoted with MBMS Data in the access network node aGW is shown. The order of the MBMS data packets is indicated e.g. based on numbering of the bits which is depicted in FIG. 2 by means of numbers corresponding to the first and the last bit number of an MBMS data packet. However, said numbering of the bits can also be represented in another way e.g. by means of only one number per MBMS Data packet indicating the sequence or the length and the sequence of the respective MBMS Data packet.

In the access network node aGW, information is added to the MBMS data packets indicating in which time intervals the MBMS data packets have to be sent from the base stations eNB to the user terminals UE. Said information is e.g. added in the form of header information comprising a time stamp T1(tx).

The allocation of time stamps T1(tx) is divided in time intervals or cycles in which the same time stamp T1(tx) is used. Within said time intervals or cycles, e.g. starting at the point in time T1(rx) and ending at the point in time T2(rx), for each MBMS data packet, the access network node aGW adds the same time stamp T1(tx) to the MBMS data packets.

In an embodiment of the invention, the timestamp T1(tx) is defined as $$T1(tx)=T1(rx)+maxDelay(aGW \text{ to } eNB)+constant$$

with maxDelay(aGW to eNB) being the maximum possible time needed for a transmission of data between the access network node aGW and a base station eNB and constant denoting a constant time offset based e.g. on the scheduling intervals in the base stations eNB.

At the point in time T2(rx), a new time interval or cycle is started.

Furthermore, in the access network node aGW, information is added to the MBMS data packets indicating the order of the distribution of the MBMS data packets. Said information is e.g. added in the form of a sequence number SN based on a bit count of the MBMS data packets or on numbers corresponding to the first and the last bit number of the MBMS data packets.

In the second row in FIG. 2, it is depicted that header information comprising a time stamp T1(tx) and a sequence number SN is added to the MBMS data packets in the access network node aGW.

Receiving information comprising the time stamp T2(tx) in the header of a MBMS data packet, a base station eNB knows that at the time T2(tx) a new time interval or cycle will start.

If the last MBMS data packet within a time interval or cycle does not totally occupy the predefined structure of the transport block, the radio frame is filled up with padding information.

A last packet of a time interval or cycle is detected either by the reception of packets for a new time interval or cycle or by no more receiving further packets for a certain time.

If no more MBMS data packets are available in the buffer, the base station eNB does not transmit further MBMS radio frames.

Based on the information in the sequence number SN, the base station eNB performs a re-ordering of out of sequences received MBMS data packets.

In case of lost MBMS data packets detected by knowledge of the sequence number SN and of the packet length of received packets, only those transport blocks are transmitted, which would not have contained bits of the lost MBMS data packets.

Figure 3:
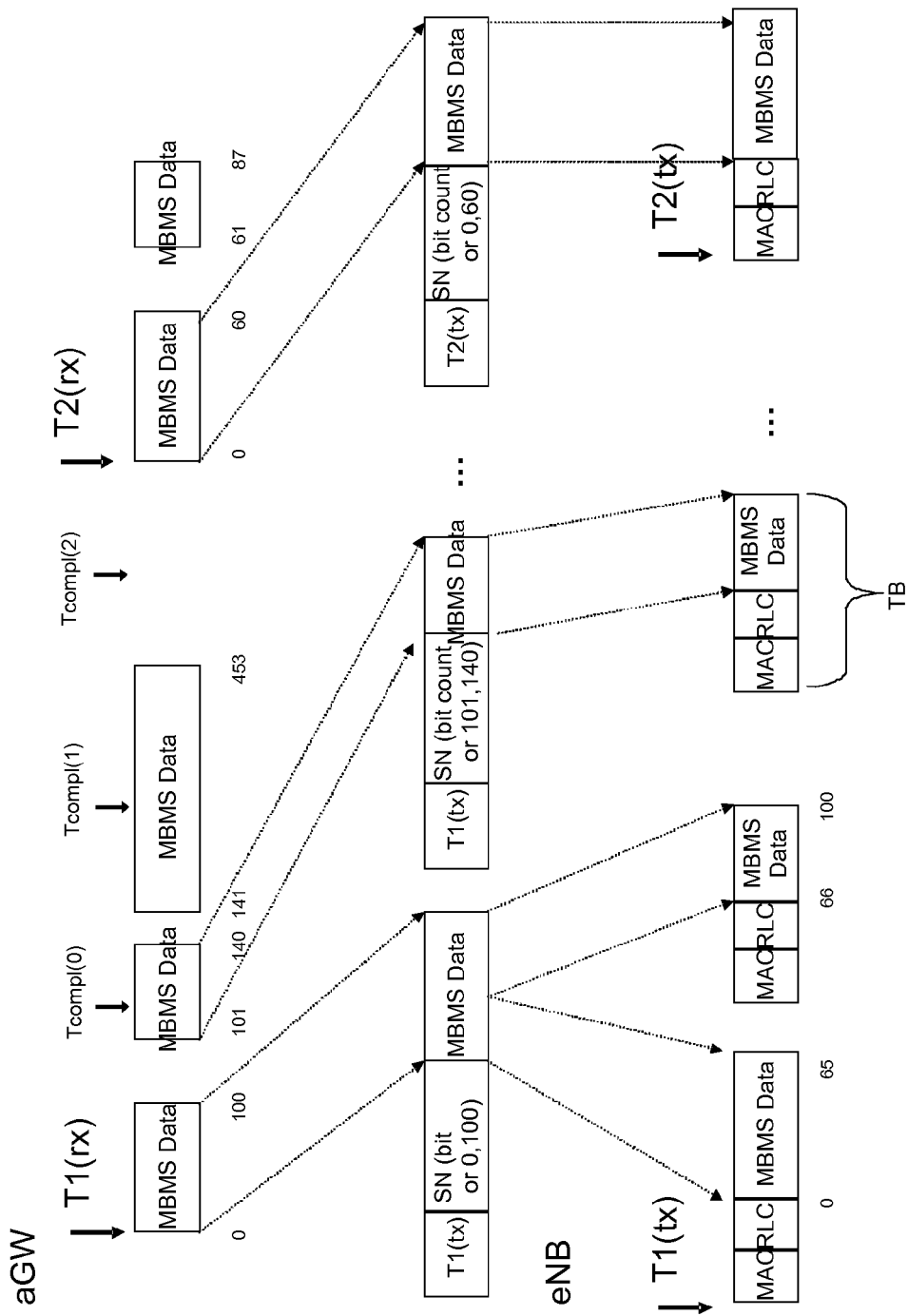
FIG. 3 schematically shows exemplarily the synchronization procedure, i.e. the handling of data packets in an access network node and in a base station, in case of data segmentation.

FIG. 3 exemplarily shows the synchronization procedure in case of MBMS data being segmented in the base stations eNB. The description of the first and the second row is equivalent to the description of the first and second row of FIG. 2.

In the third row, it is shown that the MBMS data packets are segmented in the base station eNB, if they do not completely fit into a transport block TB transmitted over the air interface, or to be more exact, if the MBMS data packets together with the necessary protocol header information do not fit into In the third row in FIG. 2, packets in the base station eNB are shown. Receiving the MBMS data packets and related header information, the base station eNB will store the MBMS data packets and related header information within a buffer.

The MBMS data packets are concatenated in the base station eNB with subsequent MBMS data packets if they are not occupying the whole length of a transport block TB.

The transport block length is determined by pre-defined radio resources, as e.g. frequencies, frequency-blocks, modulation, coding and time difference between radio frames, defined by e.g. the operation and maintenance. By adding an RLC and MAC header, a MBMS radio frame to be transmitted via the air interface to user terminals UE is created.

Transmission of packets belonging to the time interval or cycle denoted T1(tx) will start at the first transmission instant after or at the time indicated with T1(tx). The first packet to be transmitted is the MBMS data packet with the sequence number SN equal to a start value. The subsequent MBMS data packets are transmitted in the order of increasing sequence numbers SN.

The timestamp T1(tx) and the sequence number SN will preferably not be transmitted by the base station eNB to the user terminals UE.

The base stations eNB are simultaneously starting the transmission at the first transmission instant after or at the time indicated with T1(tx).

Based on the pre-configured radio resources it is assured that all other radio frames with subsequent MBMS data packets are transmitted at the same time from the base stations eNB. a transport block.

A new time interval or cycle can e.g. begin, if a transmission of a new burst from the access network node aGW is started or a maximum time interval length has been exceeded, Furthermore, a new time interval or cycle can begin if the data rate of data packets that have to be transmitted within one time interval is for a certain time period below the maximum service data rate m.

More precisely, the idea is, that subsequent MBMS data packets are virtually concatenated, i.e. transmitted using the same time stamp as previous MBMS data packets only using an updated information indicating the order of the MBMS data packets, as long as previous MBMS data packets might not be completely transmitted from a base station eNB. To determine this, we assume that MBMS data packets are transmitted from a base station eNB at least with maximum service data rate m. Therefore once a MBMS data packet is started to be transmitted from the base station eNB, it will take a virtual maximum transmit time $t=m*packet\_size$ to transmit said MBMS data packet, with packet_size denoting the size of the MBMS data packet. The transmission of the previous MBMS data packets can be additionally delayed by a time up to the upper bound S. This upper bound S is determined by an assumed maximum scheduling interval for the transmission from a base station eNB as described above.

Therefore, a virtual completion time of the previous MBMS data packets, i.e. the time needed for completion of the transmission of the previous MBMS data packets from the base station eNB, is calculated as $Tcompl=T1(rx)+S+Sum*m$, with Sum denoting the total size of all previous MBMS data packets. If a consecutive MBMS data packet arrives prior to Tcompl, it will be transmitted using the T1(tx) interval, i.e. virtually concatenated, else it will be put into a packet with a new timestamp T2(tx).

Concerning the upper bound S, it is assumed, that the access network node aGW has a possibility to ask for a maximum transfer delay Trdel from the access network node aGW to a user terminal UE. This implies that a scheduler in a base station eNB will not longer wait than S<=Trdel to schedule a packet. Otherwise the maximum transfer delay requirement can not be met.

As described above, the T1(tx) timestamp is defined as $T1(tx)=T1(rx)+maxDelay(aGW\ to\ eNB)+constant$.

In an embodiment of the invention, it can be assumed, that the parameter constant>=S.

Referring to the first row of FIG. 2 or 3, it is assumed, that an MBMS data packet is received at the time T1(rx) in the access network node aGW which is not to be virtually concatenated to previous MBMS data packets. Then it must be decided whether subsequent MBMS data packets shall be virtually concatenated to said MBMS data packet, i.e. transmitted with the same time stamp T1(tx).

For the nth subsequent MBMS data packet, we can calculate a virtual completion time of the n−1 previous MBMS data packets as $Tcompl=T1(rx)+S+Sum*m$. If a consecutive MBMS data packet arrives prior to Tcompl, it will be transmitted using the T1(tx) interval, i.e. virtually concatenated, else it will be put into a MBMS data packet with a new timestamp T2(tx).

Thereby, a delayed transmission of data from the base station eNB can be avoided.

For example, for the first subsequent MBMS data packet, the completion time is calculated as $Tcompl(0)=T1(rx)+S+$ 101*m. For the second subsequent MBMS data packet, the completion time is calculated as Tcompl(1)=T1(rx)+S+141*m.

The analog calculation is done for the $3^{rd}$ subsequent MBMS data packet shown in FIG. 2 or 3, and the completion time is calculated as Tcompl(2)=T1(rx)+S+454*m.

But for this it is assumed in the drawing that Tcompl(2)<T2(rx), where T2(rx) denotes the arrival time of the fourth MBMS data packet. Therefore a new time interval or cycle is started.

The invention claimed is:

1. A method for distribution of multimedia broadcast multicast service (MBMS) data packets from an access network node via at least one base station to at least one user terminal in a single frequency mobile communication network, comprising:
   adding information in the access network node to each of the MBMS data packets indicating in which time intervals the data packets have to be sent from the at least one base station to the at least one user terminal, and
   adding information in the access network node to each of the MBMS data packets indicating the order of the distribution of the data packets;
   wherein if a MBMS data packet does not occupy the whole length of a transport block in which it is transmitted, the MBMS data packet is concatenated with at least one subsequent MBMS data packet.

2. A method according to claim 1, wherein information indicating a new time interval is added if the transmission of a new burst is started, a maximum time interval length has been exceeded, or the data rate of data packets that have to be transmitted within one time interval is for a time period below a maximum service data rate.

3. A method according to claim 1, wherein based on said information indicating the order of the distribution of the MBMS data packets, said at least one base station performs a re-ordering of MBMS data packets received out of sequence.

4. A method according to claim 1, wherein a MBMS data packet that does not completely fit in a transport block sent from the at least one base station to the at least one user terminal is segmented.

5. A method according to claim 1, wherein the beginning of said time intervals is based on information about the transmission delay from the access network node to the at least one user terminal.

6. An access network node for distribution of multimedia broadcast multicast service (MBMS) data packets from said access network node via at least one base station to at least one user terminal in a single frequency mobile communication network wherein said access network node:
   adds information to each of the MBMS data packets indicating in which time intervals the MBMS data packets have to be sent from the at least one base station to the at least one user terminal, and
   adds information to each of the MBMS data packets indicating the order of the distribution of the data packets;
   wherein if a MBMS data packet does not occupy the whole length of a transport block in which it is transmitted, the MBMS data packet is concatenated with at least one subsequent MBMS data packet.

7. The access network node according to claim 6, wherein information indicating a new time interval is added if the transmission of a new burst is started, a maximum time interval length has been exceeded, or the data rate of data packets that have to be transmitted within one time interval is for a certain time period below a maximum service data rate.

8. A access network node according to claim 6, wherein based on said information indicating the order of the distribution of the MBMS data packets, said at least one base station performs a re-ordering of MBMS data packets received out of sequence.

9. A access network node according to claim 6, wherein a MBMS data packet is segmented if it does not completely fit in a transport block sent from the at least one base station to the at least one user terminal.

10. A access network node according to claim 6, wherein the beginning of said time intervals is based on information about the transmission delay from the access network node to the at least one user terminal.

11. A base station for distribution of multimedia broadcast multicast service (MBMS) data packets from an access network node via said base station to at least one user terminal in a single frequency mobile communication network, wherein said base station;
   sends said MBMS data packets to said at least one user terminal in a respective time interval that is indicated in information added to each of the MBMS data packets, and
   sends said MBMS data packets to said at least one user terminal in an order that is indicated in information added to each of the MBMS data packets;
   wherein if a MBMS data packet does not occupy the whole length of a transport block in which it is transmitted, the MBMS data packet is concatenated with at least one subsequent MBMS data packet.

12. The base station according to claim 11, wherein information indicating a new time interval is added if the transmission of a new burst is started, a maximum time interval length has been exceeded, or the data rate of data packets that have to be transmitted within one time interval is for a certain time period below a maximum service data rate.

13. A base station according to claim 7, wherein based on said information indicating the order of the distribution of the MBMS data packets, said at least one base station performs a re-ordering of MBMS data packets received out of sequence.

14. A base station according to claim 11, wherein a MBMS data packet is segmented if it does not completely fit in a transport block sent from the at least one base station to the at least one user terminal.

15. A base station according to claim 11, wherein the beginning of said time intervals is based on information about the transmission delay from the access network node to the at least one user terminal.

16. A single frequency mobile communication network for distribution of multimedia broadcast multicast service (MBMS) data packets from an access network node via at least one base station to at least one user terminal wherein said single frequency mobile communication network comprising:
   at least one access network node that adds information to each of the MBMS data packets indicating in which time intervals the MBMS data packets have to be sent from the at least one base station to the at least one user terminal, and that adds information to the MBMS data packets indicating the order of the distribution of the MBMS data packets, and
   and at least one base station that sends said MBMS data packets to said at least one user terminal in a respective time interval that is indicated in information added to the MBMS data packets, and that sends said MBMS data packets to said at least one user terminal in an order that is indicated in information added to each of the MBMS data packets;

wherein if a MBMS data packet does not occupy the whole length of a transport block in which it is transmitted, the MBMS data packet is concatenated with at least one subsequent MBMS data packet.

17. The single frequency mobile communication network according to claim 16, wherein information indicating a new time interval is added if the transmission of a new burst is started, a maximum time interval length has been exceeded, or the data rate of data packets that have to be transmitted within one time interval is for a certain time period below a maximum service data rate.

18. A single frequency mobile communication network according to claim 16, wherein based on said information indicating the order of the distribution of the MBMS data packets, said at least one base station performs a re-ordering of MBMS data packets received out of sequence.

19. A single frequency mobile communication network according to claim 16, wherein a MBMS data packet is segmented if it does not completely fit in a transport block sent from the at least one base station to the at least one user terminal.

20. A single frequency mobile communication network according to claim 16, wherein the beginning of said time intervals is based on information about the transmission delay from the access network node to the at least one user terminal.

* * * * *